E. C. HOELSCHE.
TIRE PROTECTOR.
APPLICATION FILED MAY 14, 1910.
996,247.
Patented June 27, 1911.
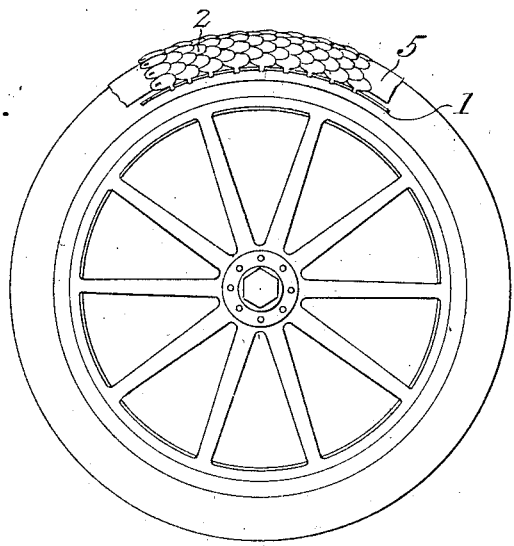
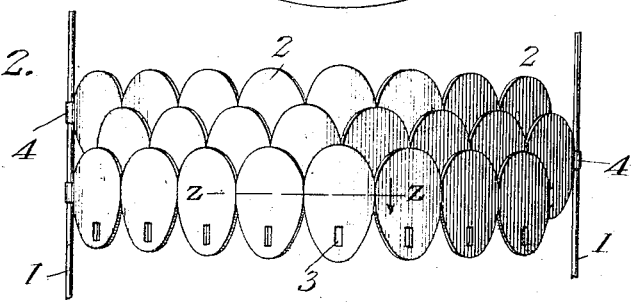
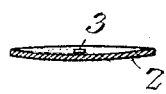
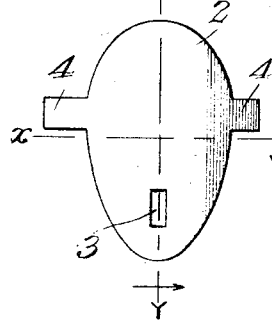
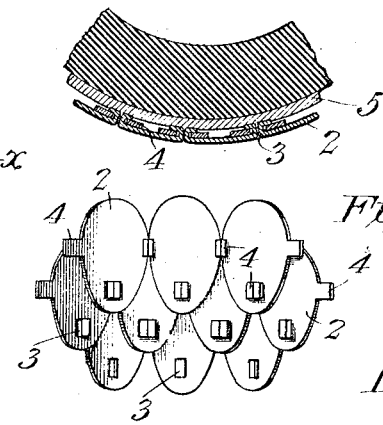
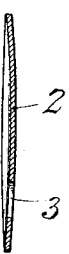
Inventor
Edmund C. Hoelsche
Witnesses
Fenton S. Belt
V. B. Hillyard
By Victor J. Evans
Attorney

UNITED STATES PATENT OFFICE.

EDMUND C. HOELSCHE, OF SOUTH CHICAGO, ILLINOIS.

TIRE-PROTECTOR.

996,247. Specification of Letters Patent. Patented June 27, 1911.

Application filed May 14, 1910. Serial No. 561,377.

*To all whom it may concern:*

Be it known that I, EDMUND C. HOELSCHE, a citizen of the United States, residing at South Chicago, in the county of Cook and State of Illinois, have invented new and useful Improvements in Tire-Protectors, of which the following is a specification.

To increase the life of pneumatic tires and to render the same practically invulnerable is a desideratum and it is the purpose of the present invention to devise novel protective means of the type forming an investment for the outer or tread portion of the tire and comprising a series of plates or scales linked in such a manner as to provide a flexible armor in which the scale elements overlap, thereby completely inclosing the part of the tire which is exposed to wear and susceptible to injury by sharp objects penetrating the same.

The present invention contemplates a protective armor comprising links or scales of peculiar form and connected in a novel manner so as to provide an effective means for prolonging the period of service of pneumatic tires and overcoming the annoyance, inconvenience and expense incident to punctures, blowouts and the like causing the deflation of pneumatic tires.

The present invention contemplates a protector of such form as to insure a complete investment of the outer portion of the tire, said protector comprising plates or scales arranged in transverse lines and linked together, the scales of one line being arranged opposite the spaces formed between the scales of adjacent lines and overlapping the same and linked thereto so as to provide a flexible armor, which while affording effective protection does not interfere with the yielding of the pneumatic tire to compensate for shock and vibration.

The invention further contemplates a novel form of scales or plates and the reinforcing of the longitudinal edges of the protector so as to withstand the circumferential strain, the plates or scales decreasing in length from a medial line toward the outer edges of the protector to give to the latter the contour or shape of the tread portion of the tire and insuring an equalization of the strain upon all the elements or links comprising the armor.

For a full understanding of the invention reference is had to the drawings hereto attached forming a part of the application, and in which, Figure 1 is a side view of a wheel provided with a tire protector embodying the invention. Fig. 2 is a plan view of a portion of the protector as seen from the outer or tread side. Fig. 3 is a view of a portion of the protector as seen from the inner side. Fig. 4 is a detail section on the line $z$—$z$ of Fig. 2. Fig. 5 is a plan view of one of the scales or plates, such as designed for the end of a line and having the outer ear longer than the inner ear. Fig. 6 is a transverse section on the line $x$—$x$ of Fig. 5. Fig. 7 is a longitudinal section on the line $y$—$y$ of Fig. 5.

Corresponding and like parts are referred to in the following description, and indicated in all the views of the drawing, by the same reference characters.

The protector or armor comprises side binders 1, which may consist of cables, stout wires or chains of a circumference to extend along opposite sides of the tire for which the protector is designed. The space between the side binders 1 is completely closed by a plurality of scales or plates 2, which are linked to one another and to the binders 1. The scales or plates 2 are arranged so as to form a complete investment for the outer surface of the tire to be protected. The form of the scales or plates is that of an oval and the scales are arranged in parallel transverse straight lines with the scales of one line opposite the spaces between the scales of adjacent lines and with the pointed ends of one line underlapping the butt or broad ends of the adjacent line of scales. The scales or plates are preferably struck from sheet metal, such as steel, of proper gage and each scale or plate is formed with a longitudinal slot 3 near the pointed end and with ears 4 at opposite sides in line with the minor axis. In assembling the scales or plates they are arranged in a transverse line with the edges touching or in close proximity to one another. The ears 4 are bent about at a right angle and pass through the slots 3 of the scales or plates of the next line, said ears after passing through the slots 3 being bent against the rear side of the scales, thereby holding the two lines of scales together. In this manner the protector is formed. The lines of scales have a staggered arrangement and the outermost scale of one line has its ear bent about the binder 1 upon one side and the outermost scale of the next line of scales has its ear bent about the binder upon the opposite side of the protector. The scales or plates are provided in different sizes, the longest scales occupying a central position and the scales decreasing in length from the center of the protector toward the edges thereof, with the result that the protector is given a form corresponding approximately to the circumferential and transverse curvature of the tire for which the protector is designed. The scales or plates curve slightly in their length and width, thereby enabling the protector to fit closely against the tire when the latter is equipped with the armor. In the preferable construction the scales or plates are formed hollow upon their inner sides and have an approximate concavo-convex outline. The relative size of the scales or plates is such as to insure a close overlapping when the protector is in position upon the tire. When the protector is in position upon a tire it is preferable to interpose a strip 5 of rawhide, leather, canvas or the like so as to protect the tire from injury by the projections formed by the bent ends of the ears 4 and from the corners and ends of the plates or scales themselves.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is—

A tire protector comprising a plurality of scales forming a complete investment of the tire and arranged in transverse parallel series, with the scales of one series in staggered relation to the scales of the adjacent series, and each series overlapping the succeeding series, each of the scales having a longitudinal slot at one end and ears at opposite sides, and the scales of one series being connected to one another and to the scales of the adjacent series by having the ears of adjacent scales of one series passing through the slots of the overlapping end portions of the scales of the adjacent series.

In testimony whereof I affix my signature in presence of two witnesses.

EDMUND C. HOELSCHE.

Witnesses:
WILLIAM GRAHAM,
JOHN J. ROWAN.